F. GARDNER.
SPEED INDICATOR.
APPLICATION FILED MAR. 17, 1919.
1,329,046.
Patented Jan. 27, 1920.
2 SHEETS—SHEET 1.
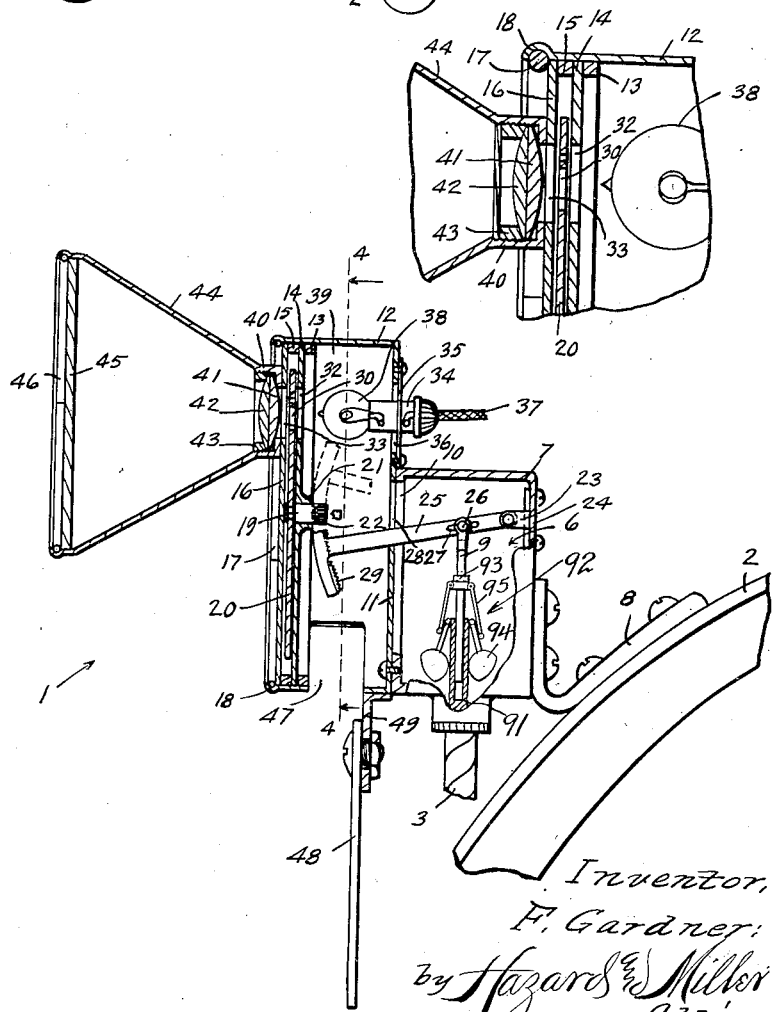

F. GARDNER.
SPEED INDICATOR.
APPLICATION FILED MAR. 17, 1919.

1,329,046.

Patented Jan. 27, 1920.
2 SHEETS—SHEET 2.

Inventor.
F. Gardner,
by Hazard & Miller
Attys.

UNITED STATES PATENT OFFICE.

FLORINDA GARDNER, OF SALT LAKE CITY, UTAH.

SPEED-INDICATOR.

1,329,046.

Specification of Letters Patent.

Patented Jan. 27, 1920.

Application filed March 17, 1919. Serial No. 283,253.

*To all whom it may concern:*

Be it known that I, FLORINDA GARDNER, a citizen of the United States, residing at Salt Lake City, in the county of Salt Lake and State of Utah, have invented new and useful Improvements in Speed-Indicators, of which the following is a specification.

My invention relates to speed indicators and consists of the novel features herein shown, described and claimed.

Specifically an object of my invention is to make a speed indicator which may be read at a distance.

Another specific object of my invention is to provide means for magnifying the reading of a speed indicator so that it may be read at a distance either at night or day.

Another object of my invention is to make a speed indicator which may be mounted upon the rear end of an automobile, or the like, or upon any conspicuous position, so that the speed at which the vehicle is going may be read by a speed cop, or other person, at a distance from the vehicle.

Figure 1 is a fragmentary perspective of a vehicle showing a speed indicator embodying the principles of my invention mounted upon the rear end of a vehicle, so that the speed at which the vehicle is moving may be read by a person at a distance from the vehicle.

Fig. 2 is a vertical central sectional detail on the line 2—2 of Fig. 1.

Fig. 3 is an enlarged fragmentary sectional detail on the same plane as Fig. 2.

Figure 4:
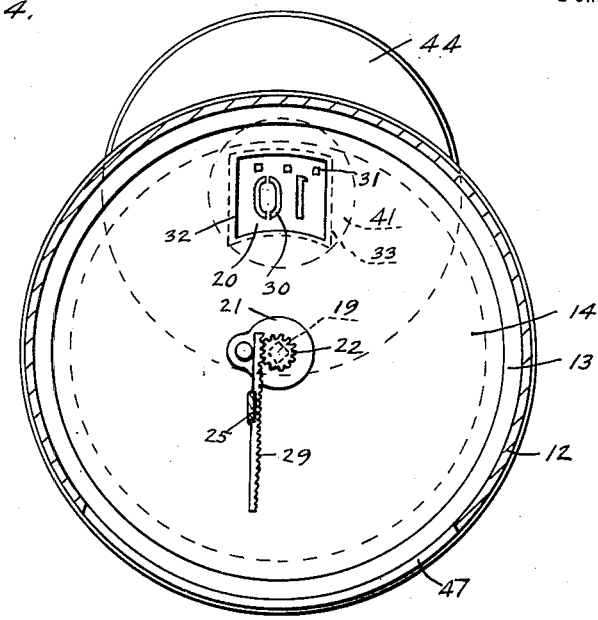
Fig. 4 is a sectional detail on the line 4—4 of Fig. 2, and looking in the direction indicated by the arrows.
Figure 5:
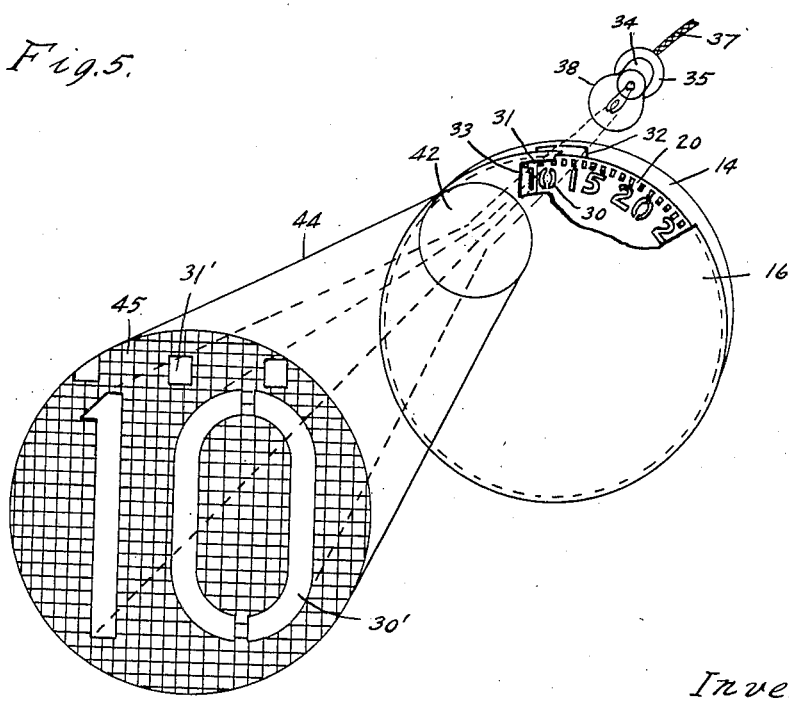
Fig. 5 is a diagrammatic view illustrating the magnifying feature.

The direction indicator 1, as shown in Figs. 1 and 2, is rigidly mounted upon the rear fender 2, and the indicator operating shaft 3 runs to the gearing 4 fixed upon the drive shaft 5. The speedometer mechanism 6 forming a part of the indicating mechanism 1 is mounted in a box 7, and the box 7 is secured to the fender 2 by a bracket 8. The speedometer mechanism 6 is not shown in detail, and may be any of the usual constructions which will cause the plunger 9 to reciprocate endwise up and down according to the speed at which the vehicle is going. The shaft 91 is rotated from the wheel and the plunger 9 is rotatably and slidably mounted in the end of the shaft 91. The centrifugal mechanism 92 engages a stop 93 upon the plunger 9 so that as the speed increases the balls 94 move outwardly and cause the links 95 to engage the stop 93 and raise the lever 25, and as the speed slows down the weight of the rack 29 will lower the lever. The box 7 has an open side 10. A casing is secured to the box 7 in position to cover the open side 10 and comprises a back plate 11 and a circular rim 12 extending from the edge of the back plate. A ring 13 is fixed in the rim 12 some distance from the back plate 11, a disk 14 is fixed in the rim 12 against the ring 13, a second ring 15 fits against the disk 14 tightly in the rim 12, a cover plate 16 fits in the rim 12 against the ring 15, and a spring ring 17 snaps into the seat 18 against the cover 16. The seat 18 is formed by bulging the rim 12, and when the ring 17 is removed the cover 16 and the ring 15 may be removed.

A spindle 19 is fixed through the center of the indicating disk 20, and the spindle is mounted in a bearing 21 at the center of the disk 14, so that the indicating disk 20 fits in the plane of the ring 15 and between the disk 14 and the cover 16. A pinion 22 is fixed upon the inner end of the spindle 19 inside of the bearing 21, a bearing bracket 23 is fixed against the inner face of the back 24 of the box 7, a lever 25 is pivoted to the bracket 23, a pin 26 is fixed through the upper end of the plunger 9 and extends through a slot 27 in the lever 25, so that as the plunger 9 reciprocates up and down the lever 25 vibrates. The lever 25 extends through a slot 28 in the back plate 11, and a segmental gear rack 29 is fixed upon the forward end of the lever 25 in mesh with the pinion 22.

The indicating numbers 30 and the indicating marks 31 are stenciled on the indicator plate 20 just inside of its edge. A light aperture 32 is formed through the disk 14, and a second light aperture 33 is formed through the cover 16 in line with the aperture 32 and in line with the indicator numbers 30 and marks 31, the apertures 32 and 33 being large enough, and only large enough, to show one number at a time.

A lamp socket 34 is fixed through a plate 35 removably mounted in place to cover an aperture 36 in the back plate 11 above the box 7, a cord 37 is connected to the socket 34, and a lamp bulb 38 is mounted in the socket 34 in the light chamber 39 between the disk 14 and back 11, and in line with the apertures 32 and 33.

An annular neck 40 is fixed to the outer face of the cover 16 around the aperture 33, magnifying lenses 41 and 42 are inserted into the neck, a ring 43 is screwed into the neck against the lenses to hold the lenses in place, a funnel 44 extends outwardly from the neck, a ground glass plate screen 45 is mounted in the outer end of the funnel and held in place by a snap ring 46, said screen being in line with the lenses 41 and 42 and the apertures 32 and 33, so that when the light is burning rays of light will pass through a number 30 and marks 31 and through the lenses 41 and 42, and the numbers and marks will appear greatly magnified upon the screen 45, and the screen being translucent the indication may be readily read upon the screen by a person at a distance from the vehicle. The action of the speedometer construction 6 will move the indicator numbers and marks forwardly and backwardly past the apertures 32 and 33, and the numbers passing these apertures will appear upon the screen 45.

An opening 47 is formed through the bottom of the rim 12, and the license plate 48 is connected to the rim 12 by a bracket 49, so that light passing downwardly from the chamber 39 will pass in front of the license plate to illuminate the license plate at night. The magnified speed indications may be read upon the screen 45 at night or at day.

Thus I have produced a speed indicator having means for magnifying the indication of a speedometer construction so that the indication may be read by a person at a distance from the vehicle.

It is obvious that the speed indicator may be mounted upon the forward end, or upon the rear end, or upon any other suitable place upon a vehicle.

Various changes may be made without departing from the spirit of my invention as claimed.

I claim:

1. A speed indicator comprising the combination with a speedometer, of a magnifying glass mounted in front of the speedometer indication, and a screen mounted in front of the magnifying glass.

2. A speed indicator comprising the combination with a speedometer, of a lens mounted in front of the exposure aperture of the speedometer to magnify the indication, and a ground glass screen mounted in front of the lens for displaying the magnified indication.

3. A speed indicator comprising the combination with a speedometer having stenciled indications and an exposure aperture, of a lamp mounted behind the stencil, a lens mounted in front of the stencil for magnifying the indication, and a ground glass screen mounted in front of the lens for displaying the magnified indication.

4. In combination with a speedometer, a rotatably mounted disk having stenciled indicating members, means for operating the disk, a lamp positioned to shine through the stencil, a magnifying lens positioned to receive and bend the rays of light passing through the stencil of the disk, and a ground glass objective positioned to depict the numbers cast in light rays through the stencil and magnified by the lens.

In testimony whereof I have signed my name to this specification.

FLORINDA GARDNER.